(No Model.)
J. H. BOWEN.
MECHANICAL MOVEMENT.
No. 425,401. Patented Apr. 15, 1890.
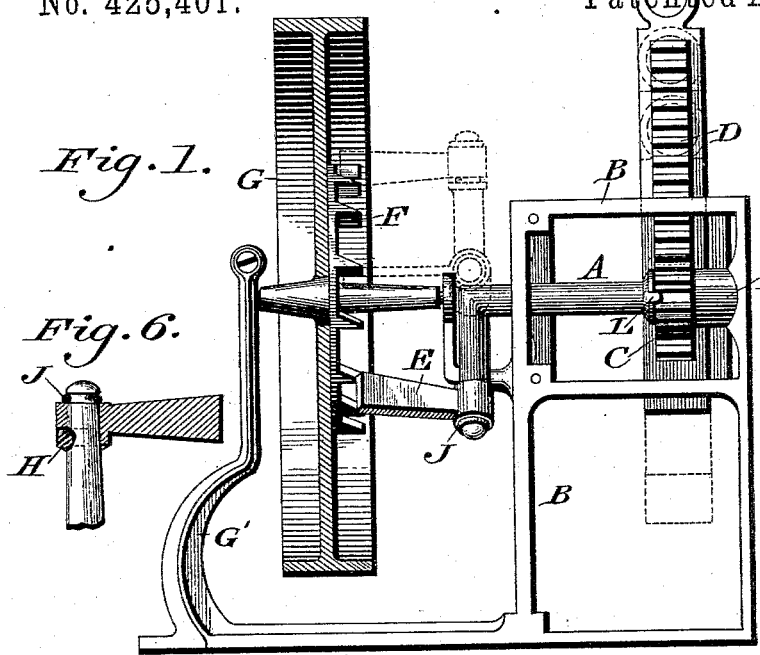
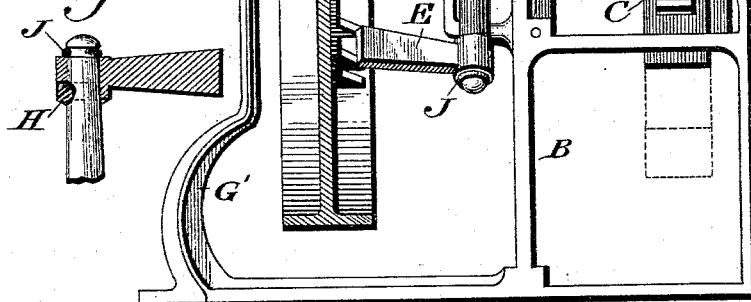
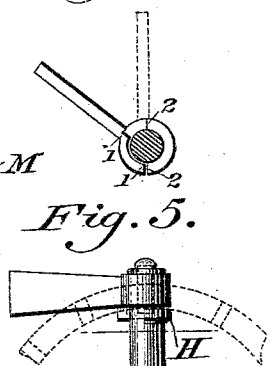
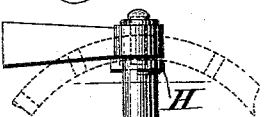
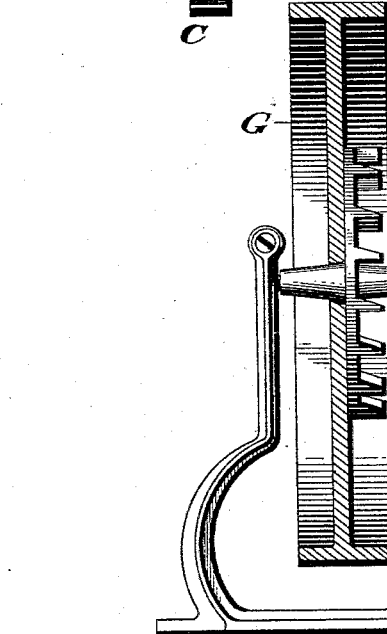
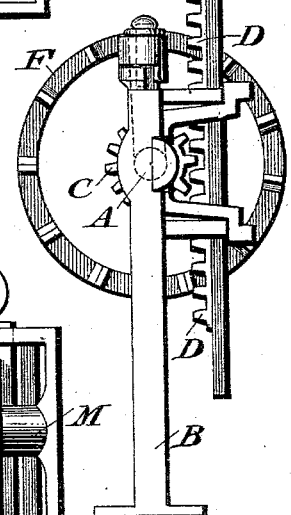
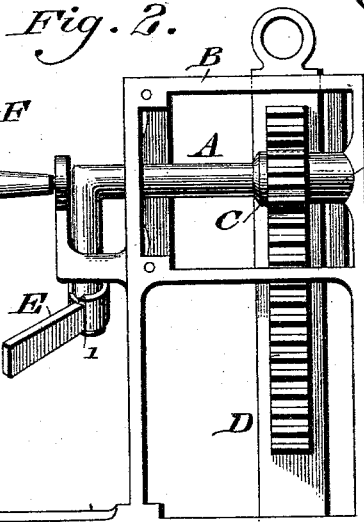
WITNESSES:
P. F. Eagle
L. Douville
INVENTOR:
James H. Bowen
BY John A. Wiedersheim
ATTORNEY.

UNITED STATES PATENT OFFICE.

JAMES H. BOWEN, OF PHILADELPHIA, PENNSYLVANIA.

MECHANICAL MOVEMENT.

SPECIFICATION forming part of Letters Patent No. 425,401, dated April 15, 1890.

Application filed June 11, 1889. Serial No. 313,878. (No model.)

*To all whom it may concern:*

Be it known that I, JAMES H. BOWEN, a citizen of the United States, residing in the city and county of Philadelphia, State of Pennsylvania, have invented a new and useful Improvement in Mechanical Movements, which improvement is fully set forth in the following specification and accompanying drawings.

My invention consists of a rotary reciprocating shaft carrying a dog or detent which is adapted to engage with a ratchet-wheel, so as to operate said wheel and then be thrown clear of the ratchet.

Figures 1 and 2 represent partial side elevations and partial vertical sections of a mechanical movement embodying my invention. Fig. 3 represents a side elevation of a portion thereof. Figs. 4, 5, and 6 represent detail views of a dog or detent and the shaft on which it is mounted. Fig. 7 represents a view of a pinion of the device and the means for fastening the same to its shaft.

Similar letters and numerals of reference indicate corresponding parts in the several figures.

Referring to the drawings, A designates a crank-shaft, which is mounted on a frame B and carries a pinion C.

D designates a sliding rack or rack-bar, which is fitted on guides on the frame B and meshes with said pinion.

On the limb of the crank-shaft A is loosely mounted a dog or detent E, which is adapted to engage with the ratchet F on the power-wheel G, the latter having its shaft suitably mounted in bearings on the frame G' or parts of the frame B. The dog or detent E when in its normal position, as is shown in Figs. 1 and 2, is below the shaft A and occupies an oblique position, so as to be set out from the ratchet F, it being noticed that a portion of the hub of the detent is cut away, forming shoulders 1, which may abut against shoulders 2 on the limb of the shaft, the swinging motion of the detent being limited to said shoulders.

The operation is as follows: The rack D is raised, whereby the shaft A is rotated and the dog carried around with the shaft A to the side opposite to that previously occupied, its end riding over the teeth of the ratchet with which it comes in contact, and being so disposed that when the dog is at its lowest point said end is beneath or behind one of the teeth. The rack is now lowered, which operation returns the detent to its first position, and as said detent engages with one of the teeth of the ratchet it is operated and power communicated to the wheel G, the detent when at its lowest point dropping from the tooth with which it engaged and turns on its axis, so as to be set back from the ratchet and be entirely clear of the path of rotation of the teeth thereof. It is evident that by continuing the rotation of the shaft the detent again engages with the ratchet, and thus communicates further motion to the wheel G. The hub or collar of the detent rests freely against the shoulder or collar H on the limb of the shaft A, and is retained in position by a split ring or band J, which enters a neck near the outer end of said limb and is in contact with said hub or collar, as most plainly seen in Fig. 6. The pinion C has a recess K in one side of the hub thereof to receive the tongue L on the shaft A. The side of the pinion opposite to the recess K rests against a boss M on the frame B, said boss forming a bearing for one end of the shaft A, the pinion thus being confined in position, as will be seen in Fig. 1.

The device herein described may be employed in connection with toys or other articles where it is desired to impart a rotary motion to parts of the same.

Having thus described my invention, what I claim as new, and desire to secure by Letters Patent, is—

1. The combination of a reciprocating rack, a frame with shaft journaled thereon, a pinion on said shaft meshing with said rack, said shaft having a limb at one end at an angle thereto, a pawl on said limb, and a rotary wheel with a ratchet-wheel on its side, substantially as described.

2. The rack D, in combination with the shaft A, having the pinion C thereon and journaled in the frame B, the pawl E, having the shoulder 1, the latter adapted to contact with a shoulder on a limb of the shaft, and a rotary wheel with ratchet-wheel on its side, the latter adapted to be engaged by said pawl, substantially as described.

3. The sliding rack D, in combination with the shaft A, having the tongue L and the pinion C thereon, the latter having a recess K in one side of its hub, the frame B, having bearings for said shaft, a pawl loosely connected to a limb of the shaft, and a rotary wheel having a ratchet-wheel connected therewith, substantially as described.

4. A sliding rack, in combination with a pinion having a recess in its hub, a shaft on which said pinion is mounted and which is provided with a tongue adapted to engage in said recess, a frame in which said shaft has bearings, a rotary wheel with side ratchet-wheel, and a pawl movable on a limb of the shaft and adapted to engage the ratchet-wheel and as the shaft revolves to be freed from said ratchet, substantially as described.

JAMES H. BOWEN.

Witnesses:
JOHN A. WIEDERSHEIM,
A. P. JENNINGS.